United States Patent Office 3,084,058
Patented Apr. 2, 1963

3,084,058
METHOD FOR IMPROVING PHYSICAL PROPERTIES OF CLAYS AND CLAY-CONTAINING SOILS AND COMPOSITIONS RESULTING THEREFROM
John B. Hemwall, Long Beach, Calif., assignor to The Dow Chemical Company, Midland, Mich., a corporation of Delaware
No Drawing. Filed May 3, 1961, Ser. No. 107,324
9 Claims. (Cl. 106—287)

This invention concerns compositions and methods for the treatment of clays and clay-containing soils having at least 5 weight percent clay, dry basis, with a substituted alkylene amide (hereafter AA) having the formula:

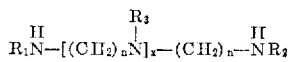

in which $x$ is an integer from 0 to 3; $n$ is an integer from 2 to 6; $R_1$ is

in which R is an aliphatic or cycloaliphatic hydrocarbon group containing from 7 to 19 carbon atoms; $R_2$ is one of $R_1$ and H; and $R_3$ is one of $R_1$ and H, such as the amides of the following acids. caprylic, capric, lauric, myristic, palmitic, stearic, oleic, linoleic, linolenic and diterpene resin, the last mentioned having the formula $C_{20}H_{30}O_2$ and structure as set forth in Fieser and Fieser, Organic Chemistry, third edition, page 948. The invention particularly concerns treating clays and clayey soils for the controlled fracturing of crust-forming soils in agriculture.

Clays and clay-containing soils are widespread, occurring naturally in various geological deposits. They have the properties of being dimensionally unstable and of forming fluid cohesive and adhesive mixtures in the presence of water. Conversely, upon drying, they become extremely stress resistant. While many of the uses of clays and clayey soils depend upon these properties, they are a distinct handicap in agriculture. Thus, clay-containing soils which have been exposed to rain or irrigation water and subsequently dried often will form crusts through which plant penetration is very difficult or impossible.

For agricultural purposes, it is impossible to avoid the use of a clay-containing soil where it exists, except to retire it from agricultural production. Frequently, however, the crusting problem with such soils is mitigated by the use of crops which are more capable of penetrating through crusts, or by planting several seeds together so that by their combined effort at least one plant will emerge, or by transplanting seedlings, in which case the plant does not need to penetrate the crusted soil surface. In many cases these are quite satisfactory solutions to the crusting problem. In other cases, however, these techniques impose restrictions on the grower that he would prefer to avoid. The other alternative used, of course, is to proceed in the hope that the conditions necessary to crust formation do not occur before the plants have penetrated the soil surface. While this is frequently the case, there are numerous times when it is not, and severe losses to the farmer result. Thus, there is a definite need for clayey soils, which, after natural or artificial watering and then drying, have the property of less stress resistance than such soils or materials when untreated. Such treated clayey soils can be considered to be less water sensitive than the corresponding untreated soils.

This invention is particularly concerned with the treatment of clays and clay-containing soils having at least 5 weight percent, dry basis, of a naturally occurring clay, e.g., of the kaolinitic, montmorillonitic, illitic or mixed layer type, with an AA compound, as specified above, in an amount ranging between about 0.0025 and 2 weight percent, dry clay basis, to improve their physical properties for agricultural purposes.

By way of illustration, the following sorts of AA compounds can be used in the practice of this invention:

N,N'-hexamethylenebis-oleamide
Diterpene resin acid amide of 3,3'-diaminodipropylamine
N,N'-(iminoditrimethylene)bis-tall oil fatty acid amide
N,N'-(iminoditrimethylene)bis-tetradecanamide
N,N'-(iminoditrimethylene)bis-dodecanamide
N-(3-(3-aminopropylamino)propyl)-tall oil fattay acid amide
N-(3-(3-aminopropylamino)propyl)-tetradecanamide
N-(3-(3-aminopropylamino)propyl)-dodecanamide
Diterpene resin acid amide of triethylenetetramine
N,N'-iminodiethylenebis-tall oil fatty acid amide
N,N'-(iminodiethylene)bis-tetradecanamide
N-(2-(2-aminoethylamino)ethyl)-tetradecanamide
Palm oil fatty acid amide of diethylenetriamine
Corn oil fatty acid amide of diethylenetriamine
Soybean oil fatty acid amide of diethylenetriamine
N-(2-(2-(2-aminoethylamino)ethylamino)ethyl)-9-octadecenamide
N-(2-(2-(2-aminoethylamino)ethylamino)ethylamino)ethyl)-9-octadecenamide
N-(2-(2-aminoethylamino)ethyl)octadecanamide
N-(2-aminoethyl)octanamide
N-(3-(3-aminopropylamino)propyl)-diterpene resin acid amide
N-(3-(3-aminopropylamino)propyl)octadecanamide They may be prepared following conventional procedures.

The AA compounds can be applied to the clay or clay-containing soil in several ways. The preferred way involves dispersing the AA compound either as a suspension or as a solution in a liquid medium and admixing the resulting liquid dispersion with the clay or clay-containing soil via spraying, slurrying or other suitable methods. Suitable liquids for dispersion have a boiling point up to ca. 150° C. and include water, ketones, alcohols and hydrocarbon solvents, mixtures thereof and emulsions thereof, either oil-in-water or water-in-oil, in which the amount of active emulsifying agent does not exceed 25% of the amount of AA compound in the formulation.

Because of the diverse nature of the AA compound utilized in the practice of this invention, some types of compounds are soluble, dispersible or emulsifiable in relatively hydrophilic media, others in relatively hydrophobic media. Upon inspection of a chemical formula, the art skilled can generally determine a solvent, dispersion medium or emulsifier satisfactory for a given AA compound. In any event, the operability and desirability of a given solvent, dispersion medium or emulsifying agent can be determined by a simple test wherein a given AA compound is dissolved, suspended or its solution emulsified in a given medium. Obviously, solvents, diluents and emulsifying agents are used which are inert toward the AA compound. Hereinafter, such solutions, suspensions and emulsions will sometimes be referred to broadly as dispersions and the solvent, suspension and emulsion media will be referred to broadly as dispersion media. Advantageously, the AA compound dispersion contains between 0.0025 and 50 weight percent of AA compound.

The treatment of the clay or clay-containing soil with the AA compound should result in the clay or clay-containing soil containing at least 0.0025% and advantageously up to 2% by weight of the AA compound, dry clay basis. The upper limit is essentially economic. The AA compounds used for agricultural purposes need be applied only to the actual volume of soil treated. Thus, when an AA compound is used to decrease soil crusting, it is practical to treat only the soil immediately above the seed row. Depending upon how carefully the AA compound is applied to this restricted volume of soil, anywhere from 0.1 pound to 10 pounds of the AA compound is sufficient to treat one acre of crop land.

The modulus of rupture (MR) is a test to determine the maximum stress that a material will withstand without breaking and is determined by subjecting a rectangular briquette to a bending moment. This test is commonly accepted by soil scientists as a measure of the crusting potential of a soil and, hence, its relative suitability as an agricultural soil. The lower the maximum stress before rupture, the less the crusting potential of the soil.

The MR was determined herein on an apparatus patterned after that as described and used by L. A. Richards in the Soil Science Society of America Proceedings, 17:321-323.

In each set of determinations conducted to provide the data for the following examples, one control was included. The control was prepared in a manner exactly analogously to the other treatments except that no AA compound was used.

The following examples describe completely specific embodiments and the best mode contemplated by the inventor for carrying out his invention. They are not to be construed as limiting the invention, which is defined in the claims.

EXAMPLE 1

A series of samples of finely ground, air-dried, slightly acid, clay loam soil was brought up to a moisture content of about 17% by spraying water as a fine mist onto the soil samples while subjecting them to thorough mixing. Various AA compounds, as indicated in following Table I, were immediately added in series to the soil samples by spraying with and mixing in 5 to 10 ml. of an acetone solution containing 20 mg. of the AA compound per 100 g. of air-dried soil to provide a treated soil containing 200 parts per million (p.p.m.) of AA compound on a dry soil weight basis.

Once the soil had been treated, it was allowed to stand in the open air for at least two hours and then was dried in an oven at 30° C. overnight. The heated soil was then divided into replicates of 25 to 30 g. each and placed into two rectangular molds 3.2 cm. wide by 6.4 cm. long. The soil in the molds was then leveled and compacted with a special compacting tool. The compacting tool has a base which covers the leveled soil sample and onto which was dropped a weight of 31.5 g. from a height of 31.5 cm. This weight was dropped repeatedly for six times, after which the soil was flooded with water. After the excess water had drained through the soil, the samples were dried overnight in an oven at 30° C. The resulting briquettes were then tested by the method cited above for their MR.

*Table I*

| AA compound: | MR in millibars |
|---|---|
| Control | 4925 |
| N,N'-hexamethylenebis-oleamide | 4400 |
| Diterpene resin acid amide of 3,3'-diaminodipropylamine | 2450 |
| N,N'-(iminoditrimethylene)bis-tall oil fatty acid amide | 2800 |
| N,N'-(iminoditrimethylene)bis-tetradecanamide | 3700 |
| N,N'-(iminoditrimethylene)bis-dodecanamide | 3200 |
| N-(3-(3-aminopropylamino)propyl)-tall oil fatty acid amide | 2900 |

*Table I*—Continued

| | MR in millibars |
|---|---|
| N-(3-(3-aminopropylamino)propyl)-tetradecanamide | 4100 |
| N-(3-(3-aminopropylamino)propyl)-dodecanamide | 3300 |
| Diterpene resin acid amide of triethylenetetramine | 1800 |
| N,N'-iminodiethylenebis-tall oil fatty acid amide | 2750 |
| N,N'-(iminodiethylene)bis-tetradecanamide | 3100 |
| N-(2-(2-aminoethylamino)ethyl)-tetradecanamide | 2900 |
| Palm oil fatty acid amide of diethylenetriamine | 2450 |
| Corn oil fatty acid amide of diethylenetriamine | 2750 |
| Soybean oil fatty acid amide of diethylenetriamine | 2250 |

EXAMPLE 2

The procedure of Example 1 was repeated with another similar soil sample with the following results:

*Table II*

| AA compound: | MR in millibars |
|---|---|
| Control | 3550 |
| N-(2-(2-(2-aminoethylamino)ethylamino)ethyl)-9-octadecenamide | 2200 |
| N-(2-(2-(2-aminoethylamino)ethylamino)ethyl)-9-octadecenamide | 2300 |

EXAMPLE 3

The procedure of Example 1 was repeated with another similar soil sample with the following results:

*Table III*

| AA compound: | MR in millibars |
|---|---|
| Control | 2700 |
| N(2-(2-aminoethylamino)ethyl)octadecanamide | 2100 |
| N-(2-aminoethyl)octanamide | 1900 |
| N-(3-(3-aminopropylamino)propyl)diterpene resin acid amide | 1400 |
| N-(3-(3-aminopropylamino)propyl)octadecanamide | 2100 |

EXAMPLE 4

Several 100 g. samples of a finely ground, air-dried, slightly acid, clay loam soil were brought up to a moisture content of about 17%. Various weights of AA compound, as indicated (5 mg., 10 mg., 50 mg., 100 mg.), were dissolved in 10-ml. aliquots of acetone and sprayed with intimate mixing onto separate samples of soil.

The soil was then evaluated by MR determinations, as given in following Table IV:

*Table IV*

| AA Compound | p.p.m. in soil | MR in millibars |
|---|---|---|
| Control | | 5,800 |
| palm oil fatty acid amide of diethylenetriamine | 50 | 4,540 |
| | 100 | 4,630 |
| | 500 | 2,360 |
| | 1,000 | 1,580 |

EXAMPLE 5

Several finely ground, air-dried samples of several soils were brought up to the moisture content indicated in following Table V–A. An amount of 40 mg. of AA compound dissolved in 10 ml. of acetone was sprayed with intimate mixing onto one sample of each soil. Thus, each soil contained 400 p.p.m. of the test chemical.

The soil was then evaluated by MR determinations, as described above. Results are given in following Table V–B.

*Table V–A*

SOILS USED

| Soil | Mechanical analysis | | | Percent O.M.[1] | pH | Moisture content at treatment in percent |
|---|---|---|---|---|---|---|
| | Sand | Silt | Clay | | | |
| B-1 | 26 | 52 | 22 | 10.7 | 5.3 | 20 |
| D-1 | 42 | 46 | 12 | 1.0 | 6.0 | 7 |
| F-3 | 38 | 36 | 26 | 0.9 | 6.7 | 8 |
| N-1 | 13 | 39 | 48 | 2.7 | 6.8 | 12 |
| L-1 | 5 | 35 | 60 | 2.1 | 7.4 | 18 |

[1] Organic matter.

*Table V–B*

| Soil | MR in millibars | |
|---|---|---|
| | AA Compound [1] | Control |
| B-1 | 500 | 560 |
| D-1 | 370 | 840 |
| F-3 | 1,420 | 1,720 |
| N-1 | 1,200 | 2,900 |
| L-1 | 4,070 | 7,120 |

[1] Palm oil fatty acid amide of diethylenetriamine.

What is claimed is:

1. The method of treatment of clays and clay-containing soils containing at least 5 weight percent clay, soil basis, by admixing therewith a dispersion, in an inert liquid dispersion medium having a boiling point up to about 150° C., of a compound having the formula:

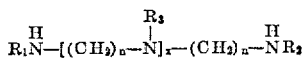

in which $x$ is an integer from 0 to 3; $n$ is an integer from 2 to 6; $R_1$ is

in which R is one of aliphatic and cycloaliphatic hydrocarbon groups containing from 7 to 19 carbon atoms; $R_2$ is one of $R_1$ and H; and $R_3$ is one of $R_1$ and H in amount sufficient to provide at least 0.0025 weight percent of said compound, dry clay basis.

2. A composition of a clay material of the group consisting of clays and clay-containing soils having at least 5 weight percent clay, dry soil basis, and containing in admixture therewith at least 0.0025 weight percent, clay basis, of a compound having the formula:

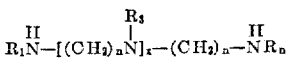

in which $x$ is an integer 0 to 3; $n$ is an integer from 2 to 6; $R_1$ is

in which R is one of aliphatic and cycloaliphatic hydrocarbon groups containing from 7 to 19 carbon atoms; $R_2$ is one of $R_1$ and H; and $R_3$ is one of $R_1$ and H.

3. The composition of claim 2 wherein the compound is a diterpene resin acid amide of 3,3'-diaminodipropylamine.

4. The composition of claim 2 wherein the compound is palm oil fatty acid amide of diethylenetriamine.

5. The composition of claim 2 wherein the compound is soybean oil fatty acid amide of diethylenetriamine.

6. The composition of claim 2 wherein the compound is N-(2-(2-(2-aminoethylamino)ethylamino)ethyl)-9-octadecenamide.

7. The composition of claim 2 wherein the compound is N-(2-(2-(2-(2-aminoethylamino)ethylamino)ethylamino)ethyl)-9-octadecenamide.

8. The composition of claim 2 wherein the compound is N-(2-aminoethyl)octanamide.

9. The composition of claim 2 wherein the compound is N-(3-(3-aminopropylamino)propyl)-diterpene resin acid amide.

References Cited in the file of this patent

UNITED STATES PATENTS

| 2,768,089 | Erickson | Oct. 23, 1956 |
| 2,864,718 | Lyons | Dec. 16, 1958 |
| 2,898,706 | Lyons | Aug. 11, 1959 |

OTHER REFERENCES

Martin: Soil Science Society of America Proceedings, volume 1, No. 1, January 1953, pages 1 to 9 (copy in 47—Soil Treatment).

UNITED STATES PATENT OFFICE
CERTIFICATE OF CORRECTION

Patent No. 3,084,058                          April 2, 1963

John B. Hemwall

It is hereby certified that error appears in the above numbered patent requiring correction and that the said Letters Patent should read as corrected below.

Column 6, lines 6 to 9, the formula should appear as shown below instead of as in the patent:

same column 6, line 30, strike out "ethylamino)".

Signed and sealed this 31st day of December 1963.

(SEAL)
Attest:
ERNEST W. SWIDER

EDWIN L. REYNOLDS

Attesting Officer                      Acting Commissioner of Patents